United States Patent [19]

Cooney et al.

[11] 4,254,475

[45] Mar. 3, 1981

[54] MICROPROCESSOR HAVING DUAL FREQUENCY CLOCK

[75] Inventors: Joseph J. Cooney, Acton; A. Joel Mannion, Cambridge, both of Mass.

[73] Assignee: Raytheon Company, Lexington, Mass.

[21] Appl. No.: 19,394

[22] Filed: Mar. 12, 1979

[51] Int. Cl.³ .............................................. G06F 1/04
[52] U.S. Cl. .................................... 364/900; 102/215
[58] Field of Search ... 364/200 MS File, 900 MS File, 364/423; 235/400; 89/1.5 E, 41 ME; 102/16, 17, 18, 215

[56] References Cited

U.S. PATENT DOCUMENTS

| | | | |
|---|---|---|---|
| 3,453,601 | 7/1969 | Bogert et al. | 364/200 |
| 3,657,571 | 4/1972 | Martin | 102/215 |
| 3,853,063 | 12/1974 | Hoyt et al. | 102/215 |
| 4,083,308 | 4/1978 | Levis | 102/215 |
| 4,116,133 | 9/1978 | Beuchat | 102/215 |
| 4,125,871 | 11/1978 | Martin | 364/900 |

*Primary Examiner*—Mark E. Nusbaum
*Assistant Examiner*—C. J. Bartz

*Attorney, Agent, or Firm*—Richard M. Sharkansky; Joseph D. Pannone

[57] ABSTRACT

A microcomputer having a microprocessor operative in response to a dual frequency clock, such microprocessor being adapted to read data stored in a programmable memory in response to address and read enable signals supplied to a programmable memory and being adapted to process such data in response to the clock pulses supplied by the dual frequency clock. The dual frequency clock produces clock pulses at a relatively low rate until such time as either a sensing device is activated or a time duration has passed, in which case the mine is to selfdestruct. When the sensor is activated the microprocessor commands the dual frequency clock to produce relatively high frequency clock pulses to enable the microprocessor to rapidly determine whether the mine should or should not be detonated. Relatively low power is consumed by the microcomputer during the period of time the processor is "counting time" and computing whether the predetermined period of time has arrived, i.e., whether the time for "self destruction" has arrived. When the sensor detects a potential enemy object, relatively rapid computation occurs in response to the relatively high frequency clock pulses to determine whether the mine should be detonated.

3 Claims, 13 Drawing Figures

MICROPROCESSOR HAVING DUAL FREQUENCY CLOCK

The invention herein described was made in the course of, or under a contract or subcontract thereunder, with the Department of Defense.

BACKGROUND OF THE INVENTION

This invention relates generally to microcomputers and more particularly to microcomputers adapted for use with small munitions.

As is known in the art, a mine is a tractical device used to deny enemy access to a specific area. A wide variety of mines have been developed (e.g., anti-shipping, anti-tank, anti-personnel), each with its own processing technique to determine whether such mine should be detonated. One particular class of mine is the scatterable land mine which must be capable of self-destruction after a specific, predetermined time interval in order to clear the mine field for access by friendly forces. The need to process information from various sensors (e.g., magnetometers, seismometer, trip wires and disturbance switches), in addition to basic timing functions, has led to the development of a variety of custom LSI digital controllers. Since these custom LSI digital controllers are not programmable, expensive chip mask redesigns are required to change the desired processing, for example, where it is desired to change the predetermined time when the mine is to self-destruct or where it is desired to control different types of mines.

It has been suggested to use programmable microcomputers for mines of the types discussed above. With such microcomputer a programmable read-only memory (PROM) would be programmed in accordance with the timing and process requirements for the particular mine application. This would, because of the inherent flexibility of the processing, offer the capability of easily personalizing the PROM at the time of manufacture. The same microprocessor could be used for a wide variety of mines with the PROM being programmed for the specific mine application. This would avoid the need to wait, and pay, for a redesign, order different parts or alter the mine assembly process.

While the use of programmable microprocessors therefore offers a potential advantage over the customary LSI digital controller, an additional requirement for use of such a microcomputer in a mine application is that it have minimum power requirements.

SUMMARY OF THE INVENTION

With this background of the invention in mind it is therefore an object of this invention to provide a microcomputer for use with tactical munitions.

It is another object of this invention to provide a microcomputer which operates with minimum power when used with such tactical munitions.

These and other objects of the invention are attained generally by providing a microcomputer having a microprocessor operative in response to a dual frequency clock, such microprocessor being adapted to read data stored in a programmable memory in response to address and read enable signals supplied to a programmable memory and being adapted to process such data in response to the clock pulses supplied by the dual frequency clock. In a mine application the dual frequency clock produces clock pulses at a relatively low rate until such time as either: (a) a sensing device is activated; or (b), a time duration has passed in which case the mine is to self-destruct. When the sensor is activated the microprocessor commands the dual frequency clock to produce relatively high frequency clock pulses to enable the microprocessor to rapidly determine whether the mine should or should not be detonated. With such arrangement relatively low power is consumed by the microcomputer during the period of time the processor is "counting time" and computing whether the predetermined period of time has arrived, i.e., whether the time for "self destruction" has arrived. If, however, the sensor detects a potential enemy object, relatively rapid computation occurs in response to the relatively high frequency clock pulses to determine whether the mine should be detonated, for example, whether the sensor detects an object for a long enough time duration to indicate the presence of a "true" object rather than the presence of a "false" object. The computation of this time duration must be performed at a rapid rate so that such computation is made before a "true" object leaves the kill area of the mine.

The read enable signal to the program memory must be activated for a sufficient period of time to allow data read from the program memory to be accepted by the microprocessor even when the microprocessor is operating at a relatively high rate required during the object's identification processing period. The read enable signal time duration is generally a fixed number of clock pulses. During the period of time that the program memory is read enabled it consumes relatively high power. While the read enable signal generated by the microprocessor is sufficiently short when the microprocessor is responding to the high frequency clock pulses, when the processor is responding to the low frequency clock pulses the microprocessor's read enable signal time period is excessively long so that use of such signal would result in a substantial amount of unnecessary power consumption by the program memory. In order to reduce this power consumption a means, triggered by a pulse produced by the microprocessor, is provided to generate a read enable pulse having a shorter time duration than the triggering pulse. While the time duration of the triggering pulse is dependent on the frequency of the clock pulses, the time duration of the generated read enable pulse is independent of the frequency of the clock pulses. This generated read enable pulse is used to read enable the program memory, reducing the time such memory is read enabled and thereby reducing the power requirements of the microcomputer.

BRIEF DESCRIPTION OF THE DRAWINGS

Other features and many of the attendant advantages of the invention will be readily appreciated as the same becomes better understood by reference to the following detailed description when considered in connection with the accompanying drawings, in which.

DESCRIPTION OF THE PREFERRED EMBODIMENT

Figure 1:
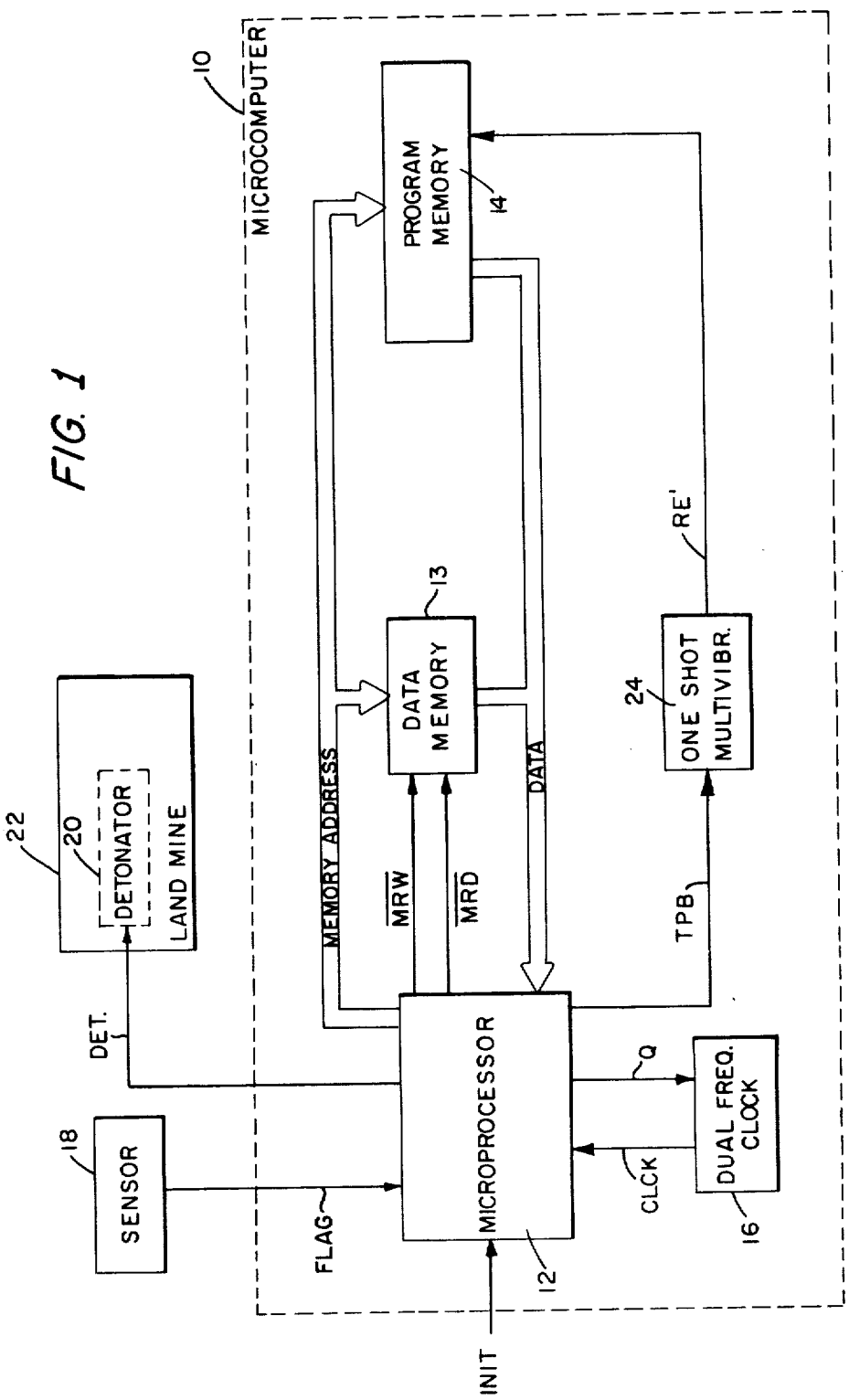
FIG. 1 is a block diagram of a microcomputer adapted to control the activation of a land mine either at a predetermined time or in response to a suitable signal produced by a sensor.

Referring now to FIG. 1, a microcomputer 10 is shown to include a microprocessor 12 adapted to process data fed thereto from either a data memory 13 or a program memory 14 in response to clock pulses fed to the microprocessor 12 from a dual frequency clock 16 via line CLCK. A signal is produced by the microprocessor 12 on line DET to activate detonator 20 and thereby cause the explosion of land mine 22 in response to either a suitable signal produced on line FLAG by a sensor 18 (here a magnetometer adapted to detect the presence of a metal object such as a tank), or data stored in the program memory 14 which represents a predetermined self-destruct time.

Microprocessor 12 is here an RCA COSMAC Model 1802 8-bit microprocessor manufactured by RCA. The data memory 13 here includes two 256×4 bit CMOS RAM memory integrated circuits, RCA Model CDP1822, and provides 256 bytes of volatile temporary storage to produce an 8-bit digital word on the DATA bus in response to a read signal produced by the microprocessor 12 on line $\overline{MRD}$ or store an 8-bit digital word from the DATA bus in response to a write enable signal produced by the microprocessor 12 on line $\overline{MWR}$. In either case, the data read from the data memory 13 or the data written into such data memory 13 is at a location fed to the data memory 13 by the microprocessor 12 on the MEMORY ADDRESS bus, as shown.

The program memory 14 is here a 512 byte memory comprised of four 256×4 bit PROM's manufactured by Harris Semiconductor, here Harris model HM9-6612-9. In response to a read enable pulse on line RE' an eight bit digital word stored in two of the PROM's at the location specified by the data on the MEMORY ADDRESS bus is coupled to the microprocessor 12 via the DATA bus. As will be discussed more fully later, it is noted that the pulse on line RE' is here 1.5 μs, a time duration sufficiently large to enable the program memory 14 to place the requested digital word on the DATA bus. Such 1.5 μs pulse is produced by a one-shot multivibrator 24 in response to a timing signal produced by the microprocessor on line TPB. The timing pulse produced by the microprocessor 12 on line TPB is here a pulse which lasts for one clock period and has a pulse repetition period of here 8 clock pulses. As will be discussed, during one phase (i.e. the early phase) of the operation of the microcomputer 10 the dual frequency clock 16 produces clock pulses on line CLCK at a relatively low frequency, here 1 KHz, while during another phase, i.e. the later phase, the clock 16 produces pulses at a higher frequency, here 256 KHz. While the microprocessor provides an enable signal in the order of six milliseconds on line $\overline{MRD}$, use of this signal would enable the program memory 14 for an unnecessarily long time period since such memory 14 need be enabled for only about 1.5 μs. Therefore, use of the signal on line $\overline{MRD}$ would require a relatively high amount of power for the memory 14. Here a one shot multivibrator 24 is used to replace the six millisecond read enable signal on on line $\overline{MRD}$ by a 1.5 μs pulse on line RE', thereby placing the memory 14 in a read enable mode for only 1.5 μs to reduce the power requirement of the memory 14.

Dual frequency clock 16, the details of which will be described in connection with FIGS. 4, 4A and 4B, produces clock pulses on line CLCK at a rate of 1 KHz when the control signal produced by microprocessor 12 on line Q represents a logical 1 condition and produces clock pulses on line CLCK at a rate of here 256 KHz when such microprocessor 12 produces a signal on line Q which represents a logical 0 condition. During the initial or early phase of operation the signal on line Q is a logical 1 and the 1 KHz rate clock pulses on line CLCK are used by the microprocessor to execute the program stored in the programmable memory 14 and to keep track of, or count, elapsed time. When the microprocessor 12 is activated by a sensor signal on line FLAG the microprocessor produces a logical 0 signal on line Q to enable more rapid operation of the microprocessor 12. It is noted, therefore, that when the microprocessor 12 is merely keeping track of elapsed time a relatively low amount of power is being consumed because of the relatively low operating or execution rate of the microcomputer 10.

Figure 2:
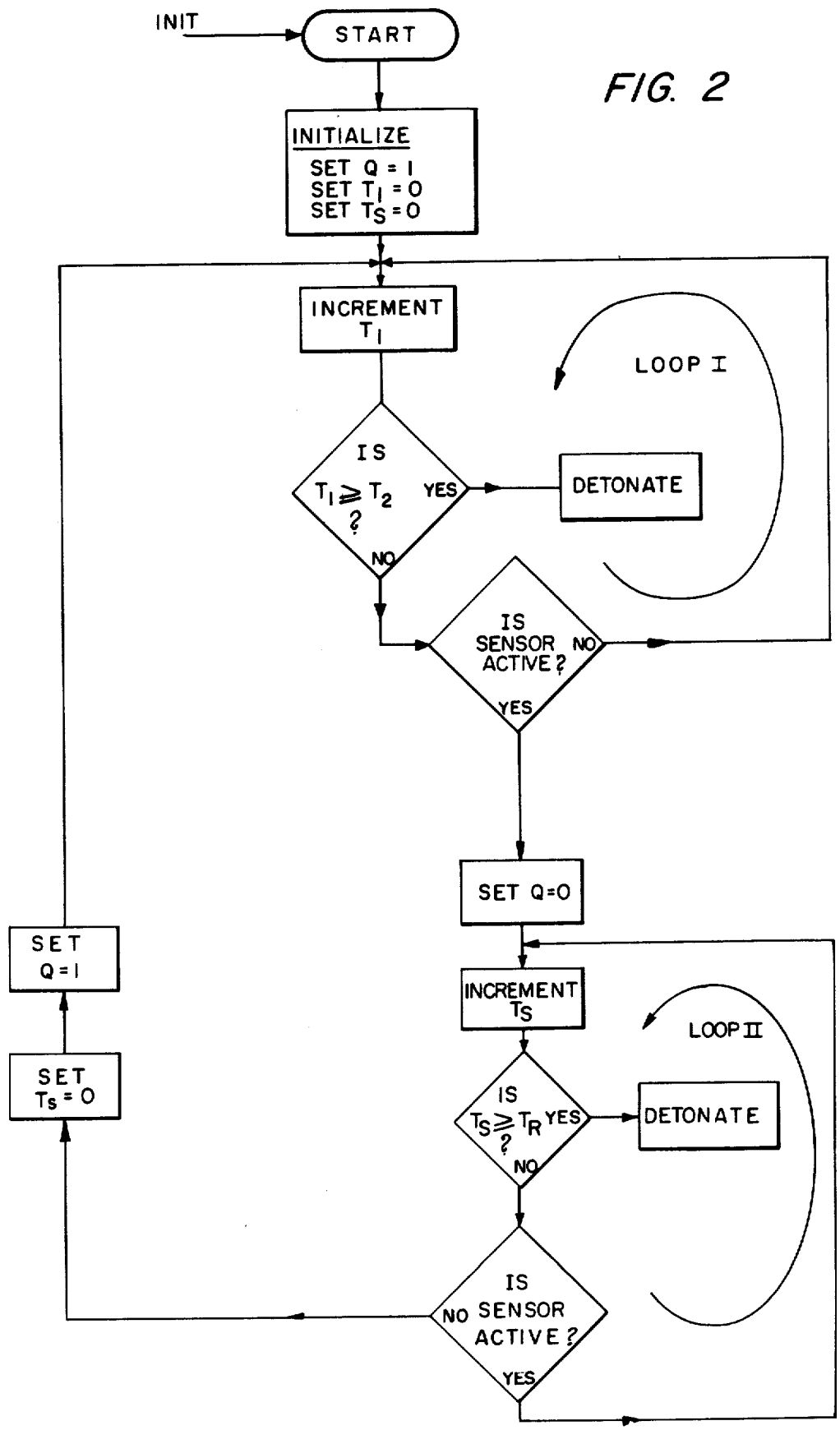
FIG. 2 is a flow diagram representative of macroinstructions stored in the program memory of the microcomputer of FIG. 1 for enabling such microcomputer to activate a land mine when a proper signal is produced by a sensor indicating the presence of a tank and for enabling such microcomputer to produce a self-destruct signal to activate the land mine after a predetermined interval of time.

Referring now also to FIG. 2 a flow diagram representative of the macroinstruction program stored in the program memory 14 is shown. In response to an initialization pulse fed to microprocessor 12 via line INIT such microprocessor 12: Produces a logical 1 signal on line Q; sets an elapsed time measurement $T_1$ to 0 and sets a sensor time measurement $T_S$ to 0. The microprocessor 12, in response to clock pulses produced by dual frequency clock 16 and fed to such microprocessor 12 via line CLCK, such clock pulses being produced at a 1 KHz rate because the logical signal on line Q represents a logical 1 state, increments the elapsed time $T_1$ in response to the clock pulses. A comparison is made between the incremented elapsed time $T_1$ and a predetermined "self-destruct" time $T_2$ stored as a macroinstruction in the programmable memory 14. If the incremented time $T_1$ is greater than or equal to the predetermined "self-destruct" time $T_2$ the microprocessor 12 produces a signal on line DET to activate detonator 20 and thereby cause the explosion of land mine 22. If the elapsed time $T_1$ is less than the predetermined "self-destruct" time $T_2$ a test is made to determine whether the signal on the sensor line FLAG indicates the presence of an object, such as a tank, sensed by sensor 18. If such line FLAG is not activated the microprocessor 12 continues to increment the elapsed time $T_1$. It is noted that during this process the microprocessor 12 is operating at a relatively low, here 1 KHz, clock rate and merely keeps track of elapsed time until the predetermined "self-destruct" time $T_2$, generally several days, is reached, at which time the elapsed time $T_1$ equals the predetermined "self-destruct" time $T_2$ and the mine self-destructs to clear the mine field for access by friendly forces. If, on the other hand, the sensor 18 is activated by an object a signal is produced on line FLAG and line Q is set to a logical 0 condition. In response to such logical 0 condition the dual frequency clock 16 produces clock pulses at a much higher rate, here 256 KHz, on line CLCK. In response to such clock pulses the time duration during which the sensor 18 is activated, i.e. the time $T_S$, is computed. The instantaneous computed value of the sensed time $T_S$ is compared with a predetermined time $T_R$. The predetermined time $T_R$ represents the expected time it will take a tank or "true" object to pass by sensor 18. $T_R$ may typically be a few seconds, and is stored as an instruction in the program memory 14. It should be noted that the computation of time $T_S$ must be rapid so that a proper determination of whether the detected object is a "true" or "false" object is made prior to the time the tank, or "true" object, being sensed leaves the kill area of the mine. In this regard it should be noted that the microprocessor is operating at a 256 KHz rate during the time the FLAG line is activated by the sensor 18. If the computed sensed time $T_S$ is equal to or greater than the predetermined time $T_R$ a signal is fed to line DET from the microprocessor to activate detonator 20 and cause the explosion of land mine 22. If the sensed time $T_S$ is less than predetermined time $T_R$ a test is made as to whether or not the FLAG line is still activated by sensor 18. If the test indicates that the FLAG line is activated the microprocessor continues to increment the sensed time $T_S$; however, if the test indicates that the FLAG line is no longer active (the sensed time $T_S$ being less than the predetermined time $T_R$), it is assumed that the object detected by sensor 18 is not a tank, but rather some "false" object. In this latter case: The sensed time $T_S$ is reset to 0; the microprocessor 12 produces a logical 1 signal on line Q; and the microprocessor 12 continues to increment the elapsed time $T_1$ at a 1 KHz rate. In summary, then, the flow chart in FIG. 2 includes two subroutine loops, indicated as loop I and loop II. When the subroutine loop I is being executed by microprocessor 12 such microprocessor 12 is operating at a relatively low, here 1 KHz, clock rate, and is being used to determine whether a predetermined "self-destruct" time, $T_2$, has been reached, at which time the land mine 22 self-destructs. When the microprocessor 12 executes the subroutine indicated by loop II such microprocessor 12 is operating at a relatively high clock rate, here 256 KHz, to determine whether a sensed object is a "true" object or a "false" object, such computation having to be made in a relatively short time interval so that if a "true" object is present the mine will detonate before the true object leaves the kill area of the mine. It is further noted that when the microprocessor 12 is executing the subroutine indicated by loop I, and is merely keeping track of elapsed time, relatively small amounts of power are being consumed by the microcomputer 10 because such microprocessor 12 is executing instructions stored in the program memory 14 at the relatively low, 1 KHz, clock rate.

Figure 3:
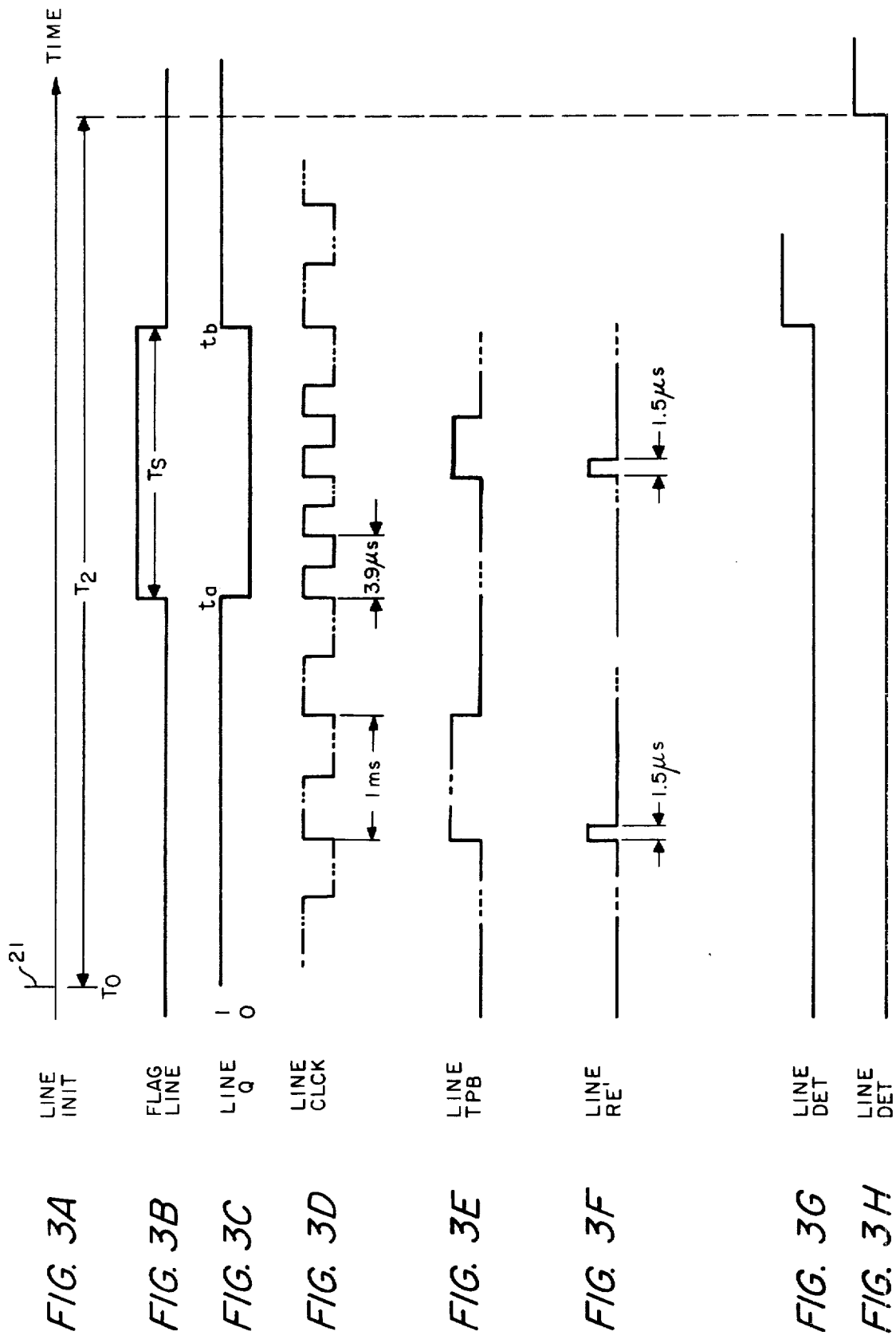
FIG. 3A-3H are timing diagrams useful in understanding the operation of the microcomputer of FIG. 1.

Referring now to FIGS. 3A-3G, at time $T_0$ an initialization pulse 21 is fed to line INIT as shown in FIG. 3A. It is noted that initially the FLAG line is "low" and that the signal on line Q is logical 1 as shown in FIGS. 3B and 3C. Further, because a logical 1 is produced on line Q, clock pulses are produced on line CLCK by the dual frequency clock 16 at a 1 KHz rate as shown in FIG. 3D. In response to each 8th clock pulse produced on line CLCK microprocessor 12 produces a timing signal or a triggering pulse on line TPB for one clock period (i.e. one millisecond) as shown in FIG. 3E. The triggering pulse on line TPB is fed to a one shot multivibrator 24, here of any conventional design, adapted to produce a pulse on line RE' in response to the leading edge of the signal on line TPB as shown in FIG. 3F. Here one shot multivibrator 24 produces a pulse 1.5 microseconds in duration on line RE'. It is noted that the time duration of the pulse on line RE' is selected in accordance with the minimum amount of time required by program memory 14 to provide data in response to an enable signal.

Referring again to FIG. 3B, at time $t_a$ a sensor signal is produced on the FLAG line by sensor 18. In response to such signal the microprocessor 12 produces a logical 0 signal on line Q as shown in FIG. 3C. The logical 0 signal on line Q causes dual frequency clock 16 to produce clock pulses on line CLCK at a 256 KHz rate as shown in FIG. 3D. It is noted that during the time period the FLAG line is active, that is, during the time clock pulses at the 256 KHz rate are fed to the microprocessor via line CLCK, a timing pulse is produced by such microprocessor on line TPB once every eight clock pulses and such pulse lasts for the time duration of one clock pulse. Here the time duration of each pulse is 3.9 microseconds. In response to the leading edge of the timing pulse on line TPB one shot multivibrator 24 again produces a pulse on line RE' having a 1.5 microsecond time duration as shown in FIG. 3F. Referring again to FIG. 3B, at time $t_b$ if the sensed time $T_S = t_b - t_a$ is greater than or equal to the predetermined time $T_R$, indicating that the object detected by sensor 18 is a "true" object, a signal is produced on line DET to activate detonator 20 and thereby cause the explosion of land mine 22 as shown in FIG. 3G. If, however, the sensed time $T_S$ is less than the predetermined time $T_R$, indicating that the sensed object is a "false" object, microprocessor 12 produces a logical 1 signal on line Q. In response to such logical 1 signal dual frequency clock 16 produces clock pulses at a 1 KHz rate on line CLCK and the microprocessor 12 again resumes measurement of the elapsed time from the time an initialization pulse was fed to the microprocessor line INIT. In response to such 1 KHz rate clock pulses, when the microprocessor 12 determines that a total elapsed time has reached the "self-destruct" time, $T_2$, the microprocessor 12 produces a signal on line DET as shown in FIG. 3H to activate detonator 20 and thereby cause the explosion of land mine 22.

Figure 4:
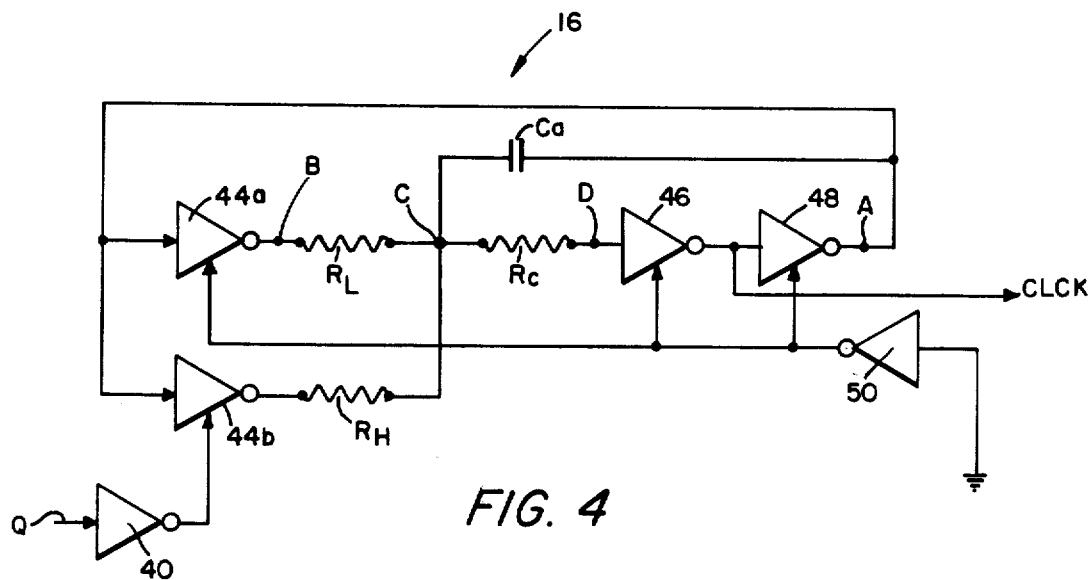
FIG. 4 is a block diagram of a dual frequency clock used in the microcomputer of FIG. 1.
Figure 4A:
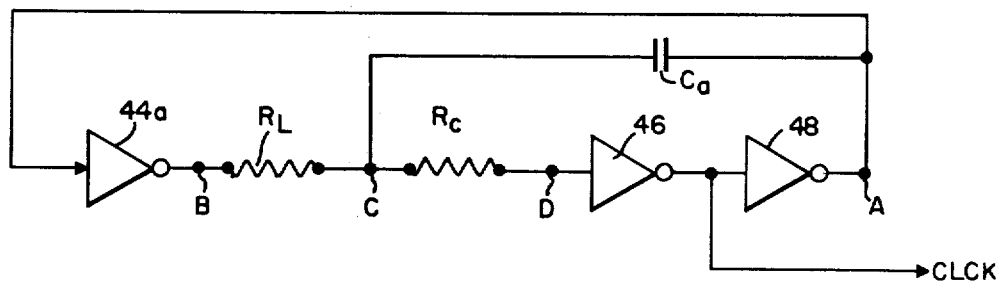
FIG. 4A is a block diagram equivalent circuit of the dual frequency clock shown in FIG. 4 when such clock is operating in a low frequency mode.
Figure 4B:
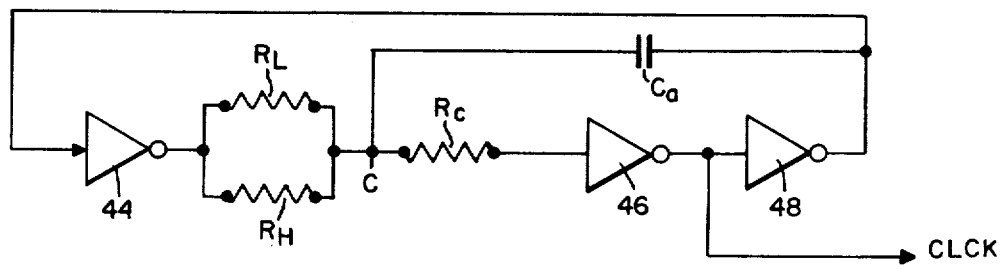
FIG. 4B is a block diagram equivalent circuit of the dual frequency clock shown in FIG. 4 when such clock is operating in a high frequency mode.

Referring now to FIG. 4, a dual frequency CLOCK 16 is shown to include four inverters 44a, 44b, 46 and 48, here manufactured by Fairchild Camera and Instrument Corporation, Mountain View, California, model F40098, arranged as shown. The signal on line Q is fed to inverter 40, the output of which is fed to inverter 44b to enable or disable such inverter 44b in a manner to be described. The output of inverter 44b is coupled to terminal C through a resistor $R_H$, as shown. The inverter 44a has its output coupled to terminal C through a resistor $R_L$, as shown. Terminal C is connected to the inputs of inverters 44a, 44b through a capacitor Ca and to terminal D, (i.e. the input of inverter 46) through a resistor $R_C$, as shown. The output of inverter 46 is coupled to line CLCK and is also coupled to the input of inverter 48, as shown. The output of inverter 48 is coupled to capacitor Ca and to the input of inverters 44a, 44b, as shown. Gating signals for inverters 44a, 46 and 48 are connected to the output of inverter 50, the input of such inverter 50 being connected to ground, as shown. When the signal on line Q is logical 1, that is a relatively high voltage, the inverter 44b is disabled and the dual frequency clock 16 may be, under such condition, represented by the schematic shown in FIG. 4A.

In operation, when terminal D is low terminal A is also low and terminal B is high. The conduction path from terminal B, through capacitor Ca, to terminal A charges the capacitor Ca. Resistor $R_C$ is largely irrelevant since the impedance to the inverter 46 at terminal D is relatively high. As the capacitor Ca charges the voltage at terminal C rises. The voltage at terminal D also rises until it is interpreted as a logical 1 condition, setting the logical state at terminal A to a logical 1 or high voltage level signal and terminal B to logical 0 or relatively low voltage signal. Now the charging path is reversed and the voltage at terminal C begins to decrease until it causes the signal at terminal D to once again be interpreted as a logical 0 (or low voltage signal) completing the cycle. The charging period, and hence the operating frequency, depends principally upon the product, or time constant, of $R_L$ and Ca. On the other hand, referring to FIG. 4, if the logical signal on line Q is logical 0, that is a low voltage, the output of inverter 40 is high, thereby enabling inverter 44b so that it works in parallel with inverter 44a. The result is a circuit which may be represented by the equivalent circuit under such condition shown in FIG. 4B. Here inverters 44a and 44b may be represented by an inverter 44, the output of which is coupled to terminal C through shunted resistors $R_L$ and $R_H$, as shown. Here the oscillation frequency is dependent upon Ca and the parallel combination of $R_L$ and $R_H$. It follows then that when the logical signal on line Q represents a logical 0 the frequency of the signal produced on line CLCK is higher than the signal produced on such line CLCK when the logical signal on line Q represents a logical 1 condition.

The resistor $R_C$ is selected to have a value in the order of 2,000 ohms. A typical value for capacitor Ca is 1,000 pf. The values of resistors $R_L$ and $R_H$ are typically 425 K ohms and 1.5 K ohms, respectively.

Having described a preferred embodiment of the invention, other embodiments incorporating these concepts will now become readily apparent to those of skill in the art. For example, instead of having the sensor coupled to a FLAG line such sensor may be coupled to an interrupt line in which case a test is not required and the program will immediately jump to the interrupt service routine in response to a sensed signal being produced by the sensor. Further, other criteria may be used to determine whether the object being sensed is a "true" or "false" object than the relatively simple measure of time $T_S$ described herein. It is felt, therefore, that this invention should not be limited the preferred embodiment, but rather should be limited only by the spirit and scope of the appended claims.

What is claimed is:

1. A microcomputer adapted to activate a mine in response to detection of a proper object or after a predetermined time period in the absence of the detection of a proper object during such predetermined time period, comprising:
   (a) clock means adapted to produce clock pulses having one of a pair of different frequencies selectively in accordance with a control signal;
   (b) sensor means adapted to produce a detection signal in response to a detected object;
   (c) a program memory adapted to store a set of instructions representing the predetermined time and criteria for determining whether a detected object is the proper object; and
   (d) a microprocessor for executing the set of stored instructions in response to the clock pulses fed thereto by the clock means to determine whether the predetermined time has arrived, and, in response to the detection signal, whether the detected object is a proper object, such microprocessor producing the control signal for the clock means to enable such clock means to produce: (i) clock pulses having a relatively low frequency when the microprocessor is determining whether the predetermined time period has arrived, enabling such microprocessor to execute such instructions at a relatively low rate; or (ii), clock pulses at a relatively high frequency when the microprocessor is determining whether the detected object is a proper object, enabling the microprocessor to execute such instructions at a relatively higher rate.

2. The microcomputer recited in claim 1 wherein the microprocessor includes means for producing triggering pulses, the time duration of each triggering pulse being related to the frequency of the clock pulses fed thereto by the clock means, such microcomputer including: Means, responsive to such produced triggering pulses, for producing a read enable pulse in response to each one of the triggering pulses, such read enable pulse having a predetermined time duration independent of the time duration of each produced triggering pulse; and means for coupling the read enable pulses to the program memory.

3. The microcomputer recited in claim 2 wherein the read enable pulse producing means is a one-shot multivibrator.

* * * * *

UNITED STATES PATENT OFFICE
CERTIFICATE OF CORRECTION

Patent No. 4,254,475        Dated March 3, 1981

Inventor(s) Joseph J. Cooney and A. Joel Mannion

It is certified that error appears in the above-identified patent and that said Letters Patent are hereby corrected as shown below:

Column 1, line 13, delete --tractical-- and replace with --tactical--;

Column 3, line 35, insert --enable-- between the words --read-- and --signal--.

Signed and Sealed this

Second Day of February 1982

[SEAL]

Attest:

Attesting Officer

GERALD J. MOSSINGHOFF
Commissioner of Patents and Trademarks